United States Patent [19]

Roe

[11] 4,330,686

[45] May 18, 1982

[54] LOUDSPEAKER SYSTEMS

[76] Inventor: Stephen Roe, Meadow Rd., Worthing, W. Sx BN11 2BT, England

[21] Appl. No.: 102,786

[22] Filed: Dec. 12, 1979

[30] Foreign Application Priority Data

Dec. 21, 1978 [GB] United Kingdom ............... 49596/78

[51] Int. Cl.³ ......................... H02H 7/20; H02H 3/10

[52] U.S. Cl. ................................ 179/1 A; 330/207 P; 361/79

[58] Field of Search ............................ 330/207 P, 298; 179/1 A, 1 SW; 361/79

[56] References Cited

U.S. PATENT DOCUMENTS

| | | | |
|---|---|---|---|
| 3,564,338 | 2/1971 | Teshirogi et al. | 361/79 |
| 3,904,979 | 9/1975 | Suzuki | 361/79 |
| 3,935,513 | 1/1976 | Suzuki | 330/207 P |
| 3,992,678 | 11/1976 | Suzuki | 330/207 P |
| 3,996,497 | 12/1976 | Kamimura | 330/207 P |
| 4,016,460 | 4/1977 | Stadler | 330/207 P |
| 4,057,767 | 11/1977 | Laupman | 330/207 P |
| 4,173,739 | 11/1979 | Yoshida | 361/79 |
| 4,173,740 | 11/1979 | Nagata et al. | 330/207 P |
| 4,216,517 | 8/1980 | Takahashi | 361/79 |

*Primary Examiner*—Bernard Konick
*Assistant Examiner*—Randall P. Myers
*Attorney, Agent, or Firm*—Basile, Weintraub & Hanlon

[57] ABSTRACT

This invention relates to a loudspeaker protection device which disconnects the drive unit, or units, of the loudspeaker from an amplifier when the voltage across, or the current through, the drive unit, or one of the drive units, exceeds a predetermined level. The protection device includes a bistable device comprising a complementary pair of transistors arranged to be changed from the reset state to the set state when the voltage on an input terminal exceeds a predetermined level. The transistors are arranged to be both non-conductive when the device is in the reset state and both conductive when the device is in the set state. When the transistors are conductive, the collector current of one of them flows through the coil of an electromagnetic relay having normally closed contacts in the output circuit of the amplifier. Signals indicating the voltage across, or the current through, the various drive coils are connected to the input terminal of the protection device through individual rectifiers so that different levels of protection can be arranged for the various frequency ranges.

10 Claims, 2 Drawing Figures

*Fig. 2.*

LOUDSPEAKER SYSTEMS

This invention relates to loudspeaker systems and it is an object of the invention to provide a protection device for use in such systems. The invention is particularly applicable to loudspeaker systems of the kind which comprise a plurality of loudspeakers adapted to reproduce different bands of frequencies and fed with their respective bands through a cross-over network.

DESCRIPTION OF THE PRIOR ART

In a sound reproduction system comprising a plurality of loudspeakers or drive units mounted in an enclosure, it will normally be the case that the units will have different power-handling capabilities. In particular, high-frequency drive units usually handle less power than low-frequency and mid-frequency units. Frequently, the amplifier with which such a sound reproduction system is used, is designed to provide the full power that can be handled by the low-frequency drive unit and, accordingly, if this full power is applied to the reproduction system, it is possible to damage one or more of the drive units. Accordingly, attempts have been made to protect the drive units by including a fuse in series with each unit. However, even so-called fast-acting fuses tend to be slow to operate and, accordingly, a drive unit may be damaged before the respective fuse breaks. Furthermore, it is difficult to ensure that a fuse always breaks at a predetermined rated current and, accordingly, in some cases, even if the fuse breaks sufficiently quickly, it may not break at the desired current.

It is an object of the invention to provide a loudspeaker protection device which does not suffer from the above disadvantages.

SUMMARY OF THE INVENTION

From one aspect of the invention consists in a loudspeaker protection device comprising electronic means responsive to the voltage across, or the current through, the voice coil of a loudspeaker and operative to energize an electromagnetic relay when said voltage or said current exceeds a predetermined level, the normally-closed contacts of said relay being connected in the drive circuit of said voice coil.

From another aspect the invention consists in a loudspeaker protection device comprising a bistable device responsive to the voltage across, or the current through, the voice coil of a loudspeaker and adapted to be changed from a reset state to a set state when said voltage or said current exceeds a predetermined level, wherein said bistable device controls an electromagnetic relay having normally-closed contacts connected in the drive circuit of said voice coil, so that said relay is energized when said bistable device is set.

When a loudspeaker protection device in accordance with the invention is used in a sound reproduction system comprising a plurality of drive units fed through a cross-over network, it is preferred that the bistable device should be connected to the individual outputs of the network so that the predetermined level at which the device is changed from the reset state to the set state can be individually set in accordance with the power-handling capacity of each of the drive units. On the other hand, the normally-closed contacts of the electromagnetic relay are preferably connected in the input circuit of the networks so that, when the relay is operated, the drive to all the loudspeakers is disconnected.

If desired, the overall time constant of the protection device may be made variable or the time contacts of the individual inputs for the different drive units may be arranged to suit the respective drive units.

Preferably manually-operable means are provided to restore the bistable device from the set state to the reset state. Further manually-operable means may be provided to change the bistable device from the reset state to the set state to enable the operation of the device to be periodically checked. This latter facility is particularly desirable if the device is battery-operated. In the case of a battery-operated device, it is also desirable to arrange the bistable device so that the current drawn from the battery when the bistable device is in the reset state is as low as possible.

BRIEF DESCRIPTION OF THE DRAWING

One method of performing the invention will now be described with reference to the accompanying diagrammatic drawings, in which.

DESCRIPTION OF THE PREFERRED EMBODIMENTS

Figure 1:
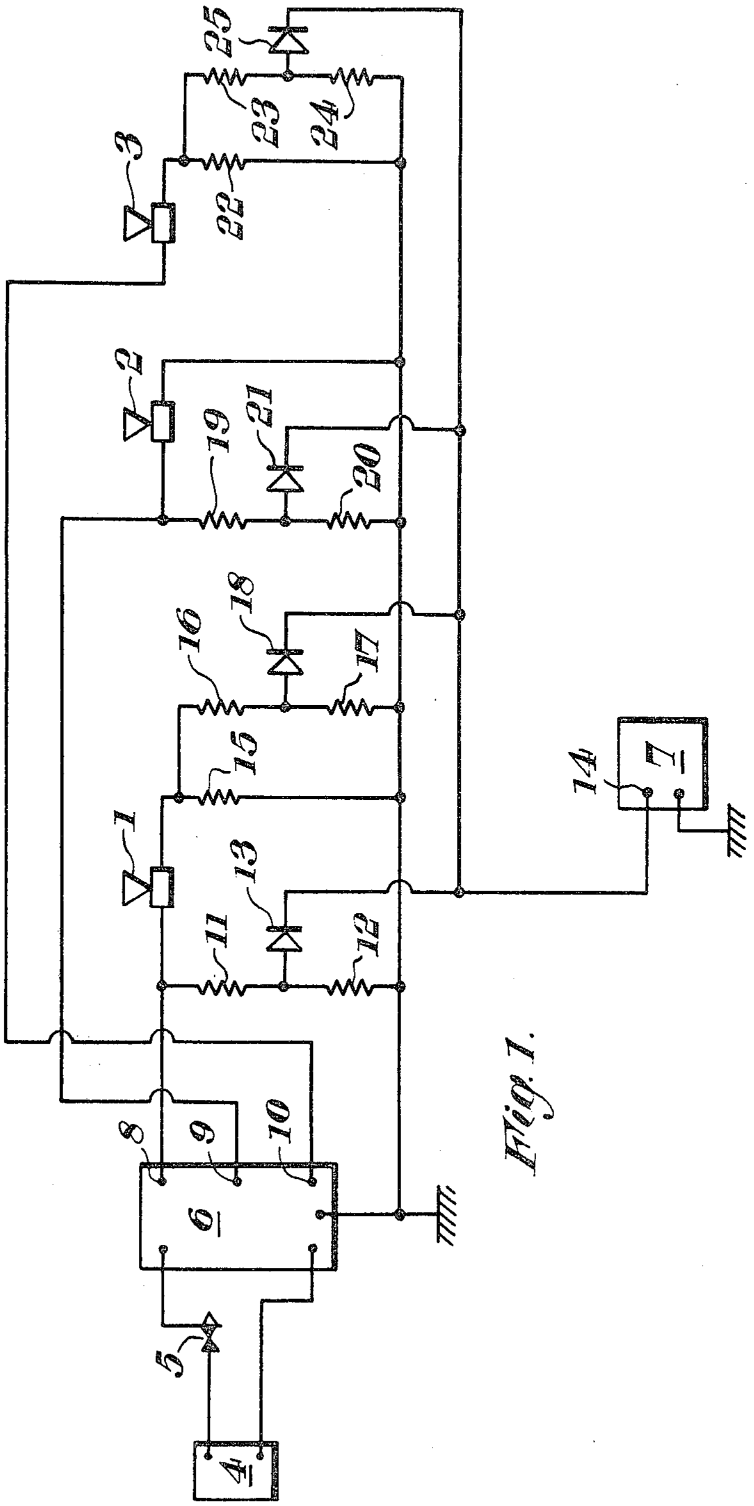
FIG. 1 is a block diagram of a loudspeaker system incorporating a loudspeaker protection device in accordance with the invention.

The loudspeaker system illustrated includes three drive units 1, 2 and 3 connected to the output terminals of a power amplifier 4 through the normally closed contacts 5 of an electromagnetic relay and a cross-over network 6. The contacts 5 are controlled by an electromagnetic relay in a loudspeaker protection device 7.

The cross-over network has three output terminals 8, 9 and 10 which carry respective bands of frequencies in the audio-frequency range. For the purposes of the present description, it will be assumed that the drive unit 1 is a high-frequency drive unit and that the terminal 8 carries the high audio frequencies; that the drive unit 2 is a mid-frequency unit and that the terminal 9 carries the middle band of frequencies; and that drive unit 3 is the low-frequency unit and that terminal 10 carries the lowest band of frequencies. However, it is to be understood that the particular connections shown in FIG. 1 for the various drive units need not necessarily be used for the particular units and frequency bands mentioned above. Similarly, in some embodiment of the invention, only two of the different forms of connection may be used, and, in yet other embodiments, all the drive units may be connected to the cross-over network by means of a similar form of connection.

As illustrated, the protection device is designed to be voltage-operated in the mid-frequency range, to be current-operated in the low-frequency range and to respond to excessive voltages or currents in the high-frequency range. Accordingly, a potential divider comprising resistors 11 and 12 is shown connected to the terminal 8, and the junction of these two resistors is connected through a diode 13 to the input terminal 14 of the protection device 7. Further, the drive unit 1 is connected in series with a low-value resistor 15, and a further potential divider consisting of resistors 16 and 17 is connected across the resistor 15. The junction of the two resistors 16 and 17 is connected to the input terminal 14 through a diode 18. The protection device 7 includes a capacitor between the terminal 14 and earth and, accordingly, this capacitor will be charged in dependence on currents supplied through both the diodes 13 and 18. Thus an increase of the potential of the terminal 14 may be brought about by either an increase in the amplitude of the signal on terminal 8, or by an increase in the current through the resistor 15.

A potential divider consisting of resistors 19 and 20 is connected between the terminal 9 and earth, and the junction of these two resistors is connected through a diode 21 to the terminal 14. Thus, in the case of the mid-range drive unit 2, the charge on the capacitor in the protection device 7 will depend on the amplitude of the signals in the mid-frequency range appearing on terminal 9.

A low-value resistor 22 is connected in series with the coil of the drive unit 3, and a potentiometer consisting of resistors 23 and 24 is connected across the resistor 22. The junction of the two resistors 23 and 24 is connected to the terminal 14 through a diode 25. Thus, in the case of the low-frequency drive unit 3, the charge on the capacitor in the protection device 7 will depend on the current through the coil of the drive unit.

Figure 2:
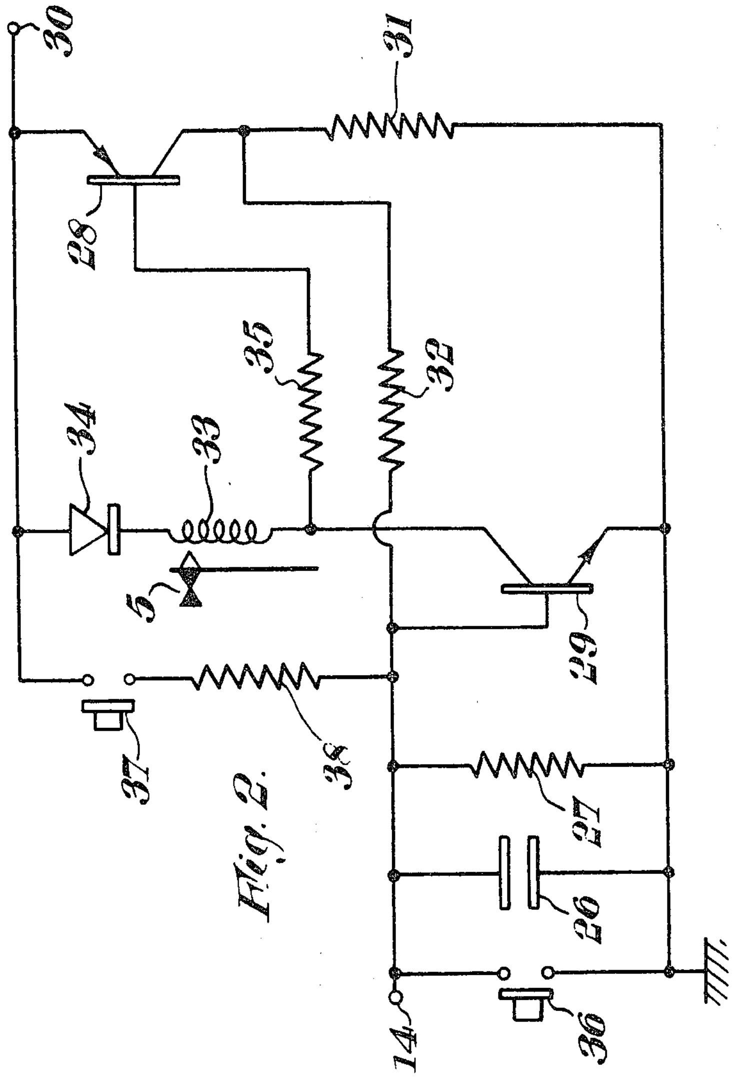
FIG. 2 is a circuit diagram of a loudspeaker protection device used in the system illustrated in FIG. 1.

The protection device illustrated in FIG. 2 includes an input terminal 14 connected to an input capacitor 26 having a discharging resistor 27 connected in parallel therewith. The protection device also includes a bistable device comprising a PNP transistor 28 and an NPN transistor 29. These two transistors are interconnected so that when the bistable device is in the reset state, both transistors are non-conducting and, when the device is in the set state, both transistors are conducting. For this purpose, the emitter of the transistor 28 is connected to a positive voltage source of, for example, 9 volts at a terminal 30. The collector of this transistor is grounded by a resistor 31 and connected to the base electrode of the transistor 29 through a resistor 32. The emitter of the transistor 29 is grounded and the collector is connected through the coil 33 of an electromagnetic relay and a light-emitting diode 34 to the positive terminal 30. The collector of the transistor 29 is also connected through a resistor 35 to the base electrode of the transistor 28.

It will be seen that, if the voltage across the capacitor 26 exceeds a threshold voltage, the transistor 29 will commence to conduct with the result that the potential of its collector will become less positive. As a result the potential of the base electrode of the transistor 28 will also be reduced so that this transistor also commences to conduct. Consequently the collector of this transistor will become more positive, and this change will be signalled to the base electrode of the transistor 29 through the coupling resistor 32. Thus the bistable device will be maintained in the set state. In this state, current will be flowing through the coil 33 and will open the normally closed contacts 5. As a result, the cross-over network 6 will be disconnected from the power amplifier 4. Current will also flow through the light-emitting diode 34 to indicate that the device is in its set state.

To enable the device to be reset, a manually operated switch 36 is provided to discharge the capacitor 26. A further manually operable switch 37 is provided to enable the operation of the device to be checked. The switch 37 is connected to the positive terminal 30, and through a resistor 38 to the terminal 14. Thus closure of the switch 37 supplies current to the base electrode of the transistors 29 to switch the bistable device over to the set state. Correct operation of the device will be indicated by illumination of the diode 34.

It is to be understood that the ratio of the values of the two resistors constituting each potential divider will be chosen to suit the power-handling capacity of the respective drive unit. In this way, the device can be arranged, for example, to disconnect the loudspeaker system from the amplifier at a relatively low level for the high-frequency signals, and at a relatively high level for the low-frequency signals.

If it is desired that the time constants should be different for the different frequency ranges, then additional parallel capacitors and series diodes must be connected between the anodes of the diodes 13, 18, 21 and 25 and the terminal 14. If the overall time constant is to be adjustable, means may be provided to switch in one or more additional capacitors in parallel with the capacitor 26.

I claim:

1. A loudspeaker protection circuit for use with a loudspeaker having a voice coil and a voice coil drive circuit comprising:

an electromagnetic relay having a normally-closed contact, said normally closed contact adapted to be connected in the drive circuit of said voice coil; and bistable means responsive to at least one of the voltage across and the current through said voice coil, said bistable means having reset and set states wherein said bistable means is nonconductive when in the reset state and conductive when in the set state, said bistable means adapted to be changed from said reset to said set state when at least one of said voltage across and said current through said voice coil exceeds a predetermined level wherein said bistable means controls said electromagnetic relay so that said electromagnetic relay is energized when said bistable means is set and wherein the current drawn by the bistable means when in a reset state is less than the current drawn when the bistable means is in the set state.

2. The protection circuit as claimed in claim 1 further including manually operable means for restoring the bistable means to the reset state from the set state.

3. The protection circuit as claimed in claim 2 further including manually operable means for changing the bistable means from the reset state to the set state.

4. The protection circuit as claimed in claim 1 wherein the bistable means is battery operated.

5. The protection circuit as claimed in claim 1 wherein the bistable means includes first and second transistors, both of said first and second transistors being non conductive when the bistable means is in the reset state and conductive when the bistable means is in the set state.

6. A loudspeaker system comprising:

a plurality of drive units each having a voice coil an amplifier;

a cross-over network connected to the output of said amplifier;

each of said voice coils of said drive units connected to the output of said cross-over network so as to be fed thereby;

an electromagnetic relay having a normally closed contact, said normally-closed contact being connected to the drive circuit of said voice coils of said drive units;

bistable means responsive to at least one of the voltage across and the current through one of said voice coils of said drive unit, said bistable means having reset and set states wherein said bistable means is nonconductive when in the reset state and conductive when in the set state, said bistable means adapted to be changed from said reset to set state when at least one of said voltage across and said current through one of said voice coils exceeds a predetermined level wherein said bistable means controls said electromagnetic relay so that said electromagnetic relay is energized when said bistable means is set, said bistable means being battery operated wherein the current drawn from said battery when said bistable means is in said reset state is less than the current drawn from said battery when said bistable means is in set state.

7. The system as claimed in claim 6 wherein the normally-closed contact of the electromagnetic relay is connected between the amplifier and the input of the cross-over network.

8. The system as claimed in claim 6 wherein a plurality of signals are fed to the input of the bistable means through individual rectifiers, the magnitude of each of said signals being dependent upon at least one of the voltage applied to and the current flowing through the respective one of the drive units.

9. The system as claimed in claim 6 further including a potential divider connected across at least one of the drive units, the tapping point of said potential divider being connected to the input of the bistable means through a rectifier.

10. The system as claimed in claim 6 further including a resistor connected in series with at least one of the drive units and a potential divider connected across said resistor, the tapping point of said potential divider being connected to the input of the bistable means through a rectifier.

* * * * *